US007454284B2

(12) United States Patent
Fosseen

(10) Patent No.: US 7,454,284 B2
(45) Date of Patent: Nov. 18, 2008

(54) METHOD AND APPARATUS FOR REMOTE COMMUNICATION AND CONTROL OF ENGINE PERFORMANCE

(75) Inventor: Dwayne Fosseen, Radcliffe, IA (US)

(73) Assignee: Mirenco, Inc., Radcliffe, IA (US)

( * ) Notice: Subject to any disclaimer, the term of this patent is extended or adjusted under 35 U.S.C. 154(b) by 0 days.

(21) Appl. No.: 11/065,743

(22) Filed: Feb. 25, 2005

(65) Prior Publication Data

US 2006/0195249 A1 Aug. 31, 2006

(51) Int. Cl.
*G01M 15/04* (2006.01)

(52) U.S. Cl. ...................................... 701/104; 701/114

(58) Field of Classification Search ................. 701/104, 701/102, 114, 115, 29, 33, 35; 73/116, 117.3; 123/399, 361

See application file for complete search history.

(56) References Cited

U.S. PATENT DOCUMENTS 6,845,314 B2 * 1/2005 Fosseen ...................... 701/114
2003/0150207 A1 * 8/2003 LaBarge et al. ............... 60/285

* cited by examiner

*Primary Examiner*—Hieu T Vo
(74) *Attorney, Agent, or Firm*—Emily E. Harris; Kent A. Herink

(57) ABSTRACT

An apparatus for remote identification of combustion performance of a vehicle is provided. The apparatus comprises a vehicle with a throttle device for control of fuel into a multiple cylinder engine of the vehicle. A sensor is provided in operative communication with the vehicle for the purpose of analyzing a vehicle combustion parameter, wherein the sensor can sense combustion of at least one cylinder of the engine. A remote communication device is provided in operative communication with the combustion sensor for communicating the combustion parameter. A remote monitoring network is provided for receiving the combustion parameter from the remote communication device over a network to enable remote monitoring of vehicle performance.

15 Claims, 5 Drawing Sheets

METHOD AND APPARATUS FOR REMOTE COMMUNICATION AND CONTROL OF ENGINE PERFORMANCE

BACKGROUND OF THE INVENTION

The present invention relates to an apparatus for remote communication of a combustion performance parameter of an engine. In particular, to the remote communication of information from one or more of a plurality of sensors of engine combustion, and preferably for controlling said combustion to improve or reduce imperfect engine performance, combustion problems, or other problems related to fuel economy.

Internal combustion engines burn a mixture of fuel and air in a combustion chamber. The ignition of the air/fuel mixture creates the energy to drive the engine, but also creates a wide variety of exhaust gases. Also, even the most efficient internal combustion engines fail to burn all of the available air/fuel mixture. Thus, in addition to exhaust gases, some amount of unburned fuel comprises another unfortunate by-product of all internal combustion engines. Some portion of these by-products of combustion find their way into the engine causing premature deterioration of the engine, while the remainder of the by-products travel through the exhaust system of the vehicle, and eventually enter the atmosphere in one form or another. Compounding the problem is the fact that the natural consequence of driving a vehicle is the degeneration of the engine in terms of its ability to run efficiently, which accelerates the problem of unwanted exhaust gases and unburned fuel over time. Thus, even the most fuel-efficient vehicles fully equipped with pollution reduction devices generate excess pollution and eventually will become progressively more wasteful and inefficient over time. The effect on the environment of exhaust gases and the other by-products of internal combustion engines comprises one of the single greatest problems faced by today's society. The prior art offers a myriad of solutions to the problems created by the by-products of combustion, however, much room for improvement still exists.

Some of the common pollutants that result from internal combustion of hydrocarbon fuels include carbon dioxide ($CO_2$)—the necessary by-product of complete combustion and a prime contributor to global warming, exhaust gases like the toxin carbon monoxide (CO), and hydrocarbons (HC) that result from incomplete combustion of the air/fuel mixture. Furthermore, various unfavorable nitrogen oxides ($NO_x$) result from the thermal fixation of nitrogen that takes place from the rapid cooling of burnt hydrocarbon fuel upon contact with the ambient atmosphere. The amount of these pollutants produced varies based on a number of factors including the type of engine involved, the age and condition of the engine, the combustion temperature, the air/fuel ratio, just to name a few. Many devices attempt to regulate and control these mechanical, environmental, and chemical processes for the purpose of reducing vehicle emissions.

For example, U.S. Pat. No. 5,315,977 discloses a device that limits fuel to an internal combustion engine in order to reduce emissions. The device, sold under the trademark EconoCruise® made by Mirenco, Inc. of Radcliffe, Iowa, reacts in response to a plurality of sensors to manipulate the maximum open throttle position. The device is very successful in eliminating and/or reducing fuel emissions by preventing a host of inefficient and wasteful driving habits that can accelerate engine deterioration as well as increase engine exhaust, and the device is effective in limiting the flow of unburned fuel into the engine.

Another such device is disclosed in U.S. Pat. No. 6,370,472, which builds on the technology disclosed in the aforementioned patent, by incorporating it into a method and apparatus for reducing vehicle emissions through the use of satellite technology. A vehicle use profile is created by driving a vehicle over a predetermined course and monitoring throttle positions at predetermined intervals. The use profile reflects the driving habits of an efficient driver and can then be reproduced on subsequent trips over the same course by automatic means.

While these inventions are highly effective in reducing vehicle emissions it may be helpful in many cases to identify on a preemptive basis engines, that due to mechanical or other problems, are generating a higher than normal amount of exhaust. In particular, engine problems that can produce inefficient use of fuel and unwanted vehicle emissions cannot be detected by visually monitoring vehicle emissions at least until the problems have reached very serious proportions. Thus, a more robust detection scheme is desirable. Similarly, routine preventative maintenance can identify inefficient vehicles in need of repair. Such a program, however, cannot detect problems that occur between maintenance intervals, and can result in performing maintenance on vehicles without any problems. While preventative maintenance is certainly beneficial, the process is not designed to identify on a realtime basis problem vehicles.

In addition, maintenance and vehicle inspection programs cannot monitor on a realtime basis wasteful habits of inefficient drivers. It is know that individual driver performance can vary dramatically and have a substantial impact on fuel economy and therefore on vehicle emissions.

Furthermore, engines that perform in remote environments can be difficult to monitor and repair in the case of problems. For example, internal combustion engines used in industrial settings like offshore oilrigs, remote mining sites, on ocean going vessels, and other similar environments can suffer from the same drawbacks discussed hereinabove. However, it can be much more difficult to diagnose and remedy such situations given the remoteness of the location.

Thus, a need exists for a method and apparatus for the realtime communication of parameter of combustion performance, especially in remote locations.

SUMMARY OF THE INVENTION

An object of the present invention comprises providing a method and apparatus for an apparatus for remote communication of a combustion performance parameter of a vehicle.

These and other objects of the present invention will become apparent to those skilled in the art upon reference to the following specification, drawings, and claims.

The present invention intends to overcome the difficulties encountered heretofore. To that end, an apparatus for remote identification of combustion performance of a vehicle is provided. The apparatus comprises a vehicle with a throttle device for control of fuel into a multiple cylinder engine of the vehicle. A sensor is provided in operative communication with the vehicle for the purpose of analyzing a vehicle combustion parameter, wherein the sensor can sense combustion of at least one cylinder of the engine. A remote communication device is provided in operative communication with the combustion sensor for communicating the combustion parameter. A remote monitoring network is provided for receiving the combustion parameter from the remote communication device over a network to enable remote monitoring of vehicle performance.

DETAILED DESCRIPTION OF THE INVENTION

Figure 1:
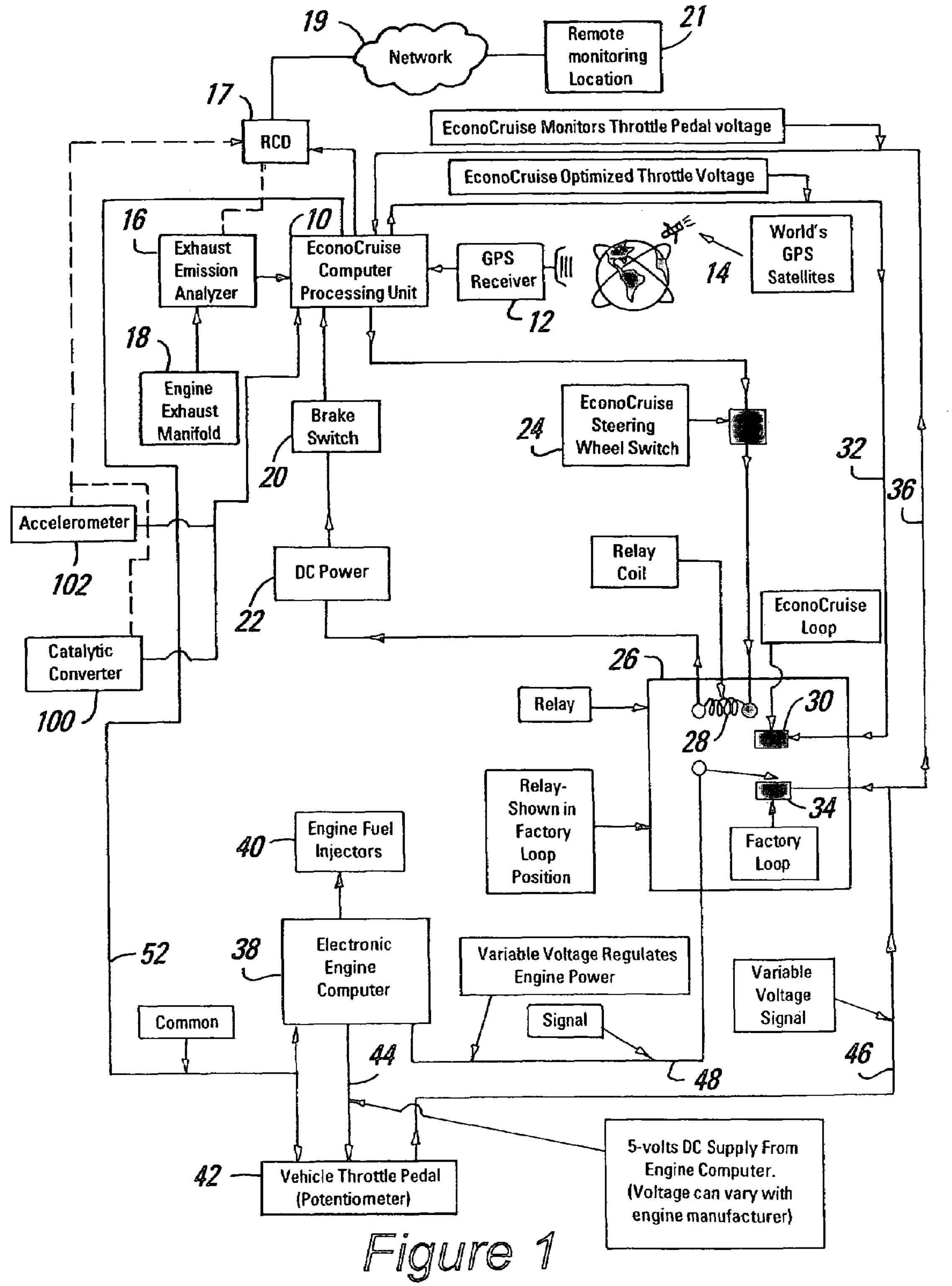
FIG. 1 is a schematic drawing of the present invention for control of an engine, and monitoring a combustion parameter.

In the Figures, FIG. 1 shows a schematic diagram of the present invention. In modern vehicles, an electronic engine computer 38 controls important engine functions including throttle control. Typically, the engine computer 38 sends and receives and sends a throttle voltage control signal to and from a throttle pedal 42 in the form of a 5 v DC signal. The throttle voltage signal varies in proportion to the desired change in vehicle speed. In the case of car controlled manually by the driver, the engine computer 38 receives a throttle voltage control signal along a direct path 44 between the engine computer 38 and the throttle pedal 42. The engine computer 38 can then translate the throttle voltage into the appropriate signal to the fuel injectors 40 to ensure an engine response in proportion to the throttle voltage.

Figure 3:
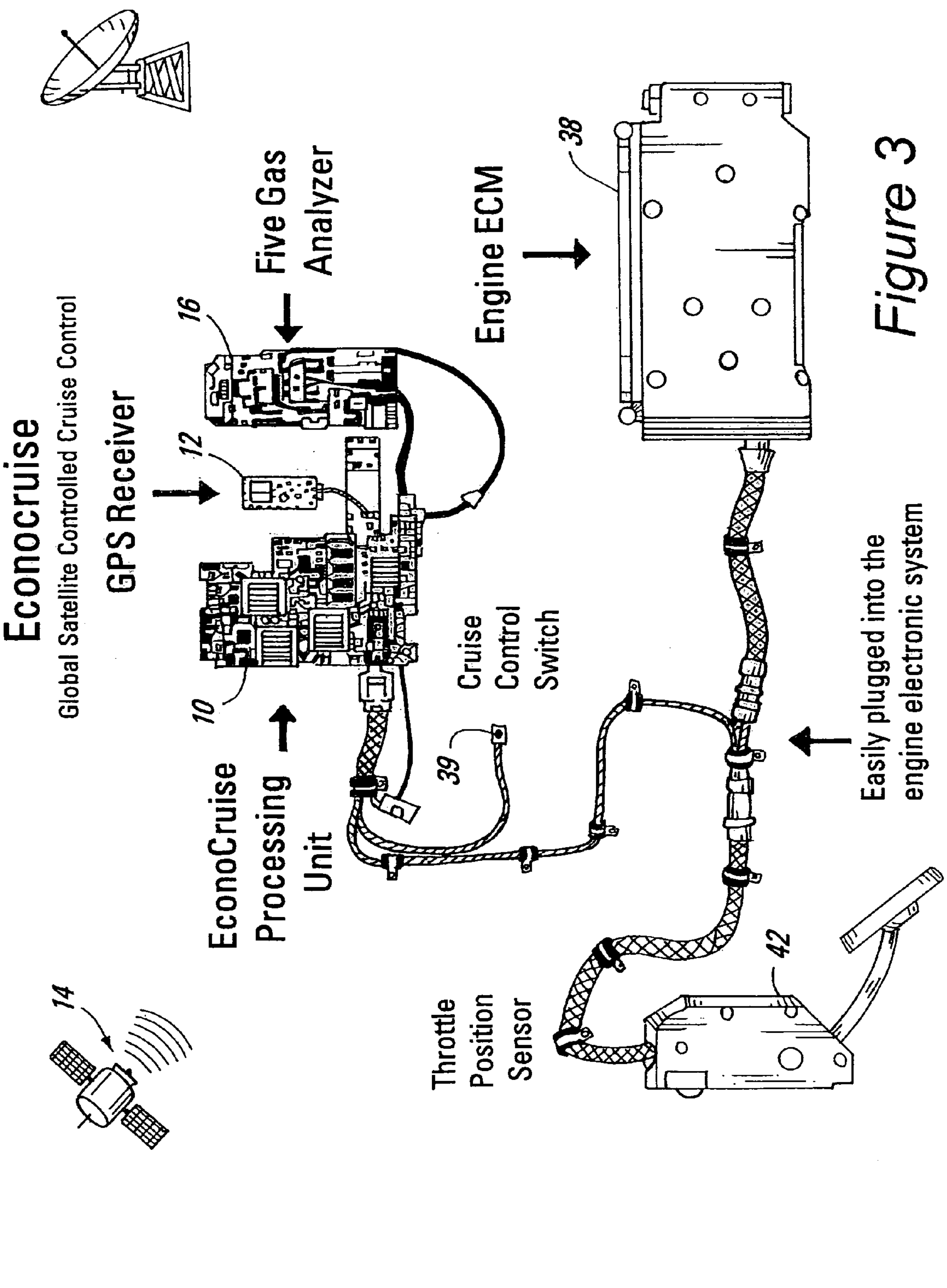
FIG. 3 is a breadboard diagram of a portion of the engine control apparatus of the present invention.

In most modern vehicles, the engine computer 38 can take control of the throttle through a cruise control device 39 (see FIG. 3). In this case, the engine computer 38 would take control of the throttle voltage via the throttle voltage control signal path 44 between the engine computer 38 and the throttle pedal 42. This creates a feedback loop that allows the engine computer 38 to adjust the throttle voltage at the pedal 42 to control the vehicle to a certain speed.

In part, the present invention builds on the cruise control model in the following manner. The invention includes a general-purpose computer 10 that uses a software control program to take control of the throttle voltage and control of a vehicle in accord with a pre-selected response from a plurality of external sensors. Those of ordinary skill in the art will appreciate that the computer 10 could consist of a lap top computer, a dedicated embedded controller device like the EconoCruise device, an electronic engine computer, or any other similar computer. In particular, the computer 10 is connected to a Global Positioning Satellite receiver 12 ("GPS") that receives absolute position information from an array of satellites 14. The computer 10 is also connected to an exhaust emission analyzer 16 that is in operable communication with the exhaust manifold 18 of the engine of the vehicle. In the preferred embodiment of the present invention the exhaust analyzer 16 consists of a Model 6600 miniature automotive analyzer commercial available from Andros Incorporated of Berkeley, Calif. However, those of ordinary skill in the art will understand that any similar suitable analyzer could be used. In addition, the computer 10 interfaces with the engine computer 38 and the throttle pedal 42 in a manner that allows the computer 10 to control the throttle pedal 42 in the manner of a cruise control device.

The invention employs a simple relay switch 26, which switches between a factory throttle control position and a position whereby the computer 10 controls the throttle. In particular, the relay switch 26 employs a relay coil 28 that triggers the relay switch 26. FIG. 1 shows the relay switch 26 set to the factory throttle control position 34. In position 34, the engine computer 38 assumes standard control over the throttle pedal 42. In position 34 the engine computer 38 controls the throttle pedal 42 along the throttle voltage control signal path 44. The throttle pedal communicates with the engine computer 38 along the throttle voltage control signal path 46, 48. In the factory throttle control position 34, throttle voltage control signal path 36 allows the computer 10 to monitor and record the throttle voltage signal.

With the relay switch 26 set to a throttle voltage control position 30 the computer 10 assumes control over the throttle pedal 42, and control over the throttle signal sent to the engine computer 38. In position 30, the throttle signal travels from the throttle pedal 42 along the throttle voltage control path 46, 36 to the computer 10. The computer 10 can then send the throttle voltage signal back to the engine computer 38 and to the throttle pedal 42 along throttle voltage control path 32, 48, 44. The invention includes a common ground path 52 linking the computer 10, engine computer 38, and throttle pedal 42. Two manually activated switches actually trigger the relay switch 26. A brake switch 20 is connected through a DC power supply 22 to the relay switch 26, to allow the driver to manually set the relay switch 26 to the factory control position 34 by tapping the brake pedal. A steering wheel switch 24 allows the driver to manually set the relay switch 26 in either the factory control position 34 or the computer control position 20.

Figure 2:
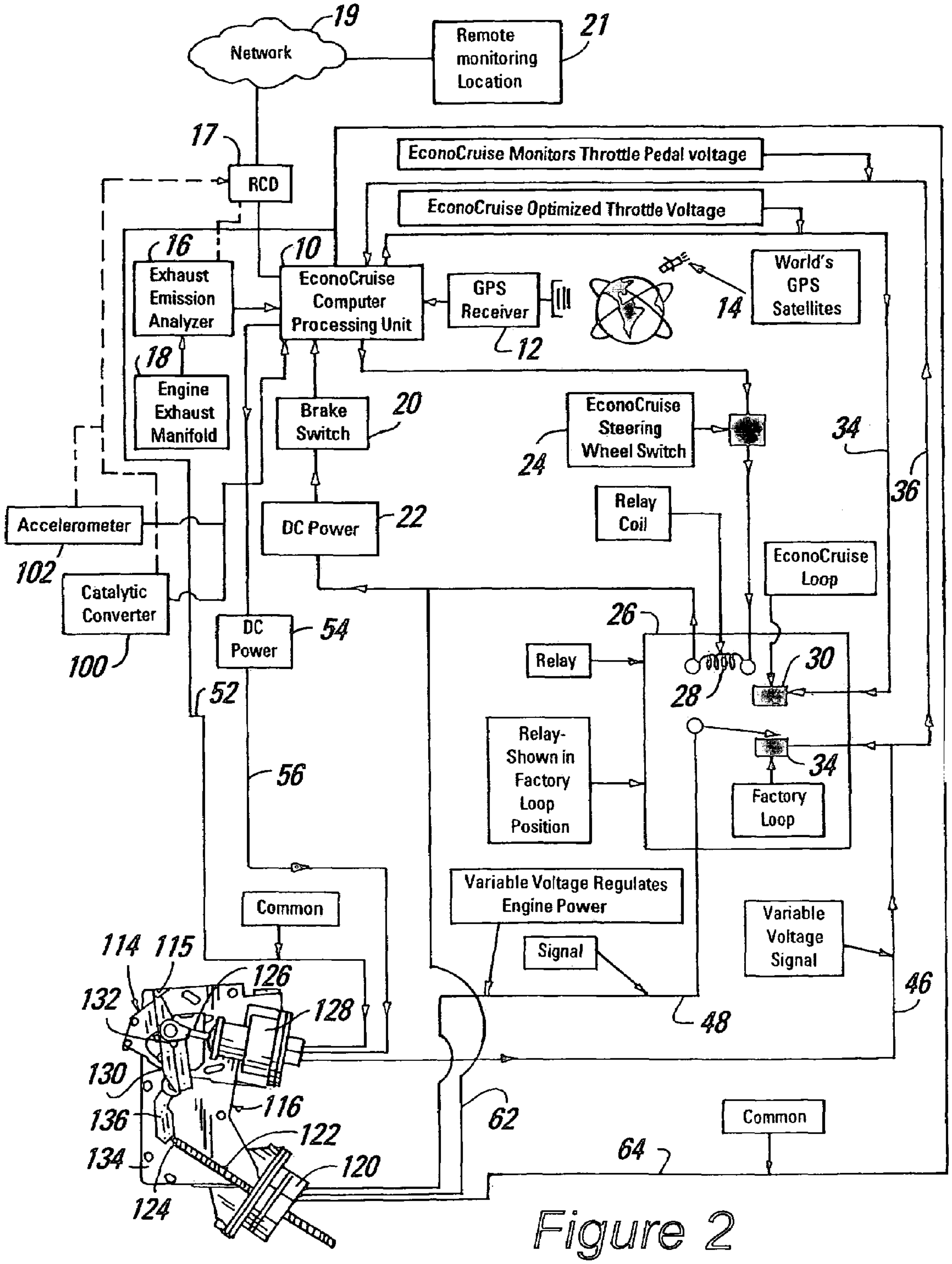
FIG. 2 is a combination schematic and plan view of an alternative embodiment of the present invention for monitoring a combustion parameter and control of an engine without an electronic throttle.

FIG. 2 shows an alternative embodiment of the present invention for use with vehicles without engine computers, or electronic voltage control capacity. In this embodiment, a throttle apparatus 114 is mounted atop a governor control box 116. The governor control box 116 includes a top plate 134 on which is mounted a speed control lever 130. The speed control lever 130 pivots about the pivotal mount 132 that extends down through the top plate 134. The speed control lever 130 is controlled in response to a throttle cable (not shown) that extends from the throttle pedal or foot-operated accelerator pedal (not shown) to a throttle cable hook 115. The throttle cable hooks to the speed control lever 130, and moves the speed control lever 130 in response to changes in the throttle pedal as controlled by the driver's foot. Movement of the speed control lever 130 serves to control the flow of fuel into the engine, thereby controlling the vehicle speed. Also mounted to the top plate 134 is a stop lever 136. The stop lever 136 is mounted for pivotal movement on a vertical shaft that extends through the top plate 134. The stop lever 134 is biased toward an ideal position. Placing a physical stop in the path of the stop lever 134 serves to limit the maximum movement of the speed control lever 130, and thereby limits the maximum rate that fuel enters the engine. The exact operational details of the interaction between the governor control box 116 and its related engine components are disclosed in more detail in U.S. Pat. No. 5,315,977.

In the present invention, a linear actuator 120 (or alternatively a stepper motor), controlled by the computer 10, is mounted to the top plate 134 of the governor control box 116. The linear actuator 120 is interfaced with the computer 10 by the common ground line 64, and along the throttle control signal path 48, 36. The linear actuator 120 is linked to DC power supply 22 along signal path 62. The linear actuator 120 has a screw 122 that is extendable and retractable in fine, exact, and reproducible increments. An end 124 of the screw 122 serves as a mechanical stop for the stop lever 136. The linear actuator 120 interfaced to the computer 10 provides a means to control the throttle of engines that do not include an electronic throttle voltage signal.

A potentiometer 128 is mounted to the top plate 134. The potentiometer 128 includes cylinder 126 that mounts to the speed control lever 130. The cylinder 126 extends and retracts in response to movement of the speed control lever 130. The position of the cylinder 126 is translated to a voltage signal by the potentiometer 128, wherein the signal correlates to the throttle position. The voltage signal is interfaced with the computer 10 in the following manner. The potentiometer 128 has a common ground 52, and is powered by DC power supply 54. The DC power supply 54 is linked to the computer 10 and sends power to the potentiometer 128 along signal path 56. An output signal is sent from the potentiometer 128 to the computer along signal path 46, 36. The output signal consists of the throttle position as measured and converted to an electronic voltage signal by the potentiometer 128. In this manner, the potentiometer 128 allows the computer to monitor an electronic throttle voltage signal.

The computer 10, linked to the potentiometer 128 and linear actuator 120, controls the operation of the engine in the manner described above in reference to engines with electronic throttle control. In the embodiment of the invention shown in FIG. 2, when the relay switch 26 is in the factory control position 34, the linear actuator 120 is programmed to withdraw the screw 122 to its retracted position such that the stop lever 136 and the speed control lever 130 operate without interference. In the factory control position 34, the computer 10 can still monitor the throttle voltage via the signal path 46, 36 extending from the potentiometer 128 to the computer 10. With the relay switch 26 in the throttle voltage control position 30, the computer 10 receives the converted throttle voltage signal from the potentiometer 128 along the signal path 46, 36 and can control the throttle by sending signals to the linear actuator 120 along the signal path 34, 48. Thus, the computer 10 can execute engine control in the same manner described hereinabove in reference to the embodiment shown in FIG. 1. Of course, those of ordinary skill in the art will understand that, without departing from the scope of the intended invention, the specific configuration required for controlling vehicles without electronic throttles and/or electronic engine computer will vary depending on the make and model of the vehicle involved.

In the various manners described hereinabove, the computer 10 can directly assume control of the throttle voltage in response to one or more of the sensors. Specifically, the computer 10 can take control of the throttle voltage and manage the voltage in response to at least three sensor inputs. First, the computer can manage the throttle position in the same manner as a conventional cruise control. That is the system can adjust the throttle voltage based on driving conditions to maintain as close as possible a constant speed. Secondly, the computer 10 can control the throttle voltage in response to input from the emission analyzer 16. In this mode, the computer may monitor the emission analyzer 16 to ensure that the emissions stay below a certain level. For example, through experimentation it may be desired to keep emission levels below a certain opacity threshold (where 0% would be completely clear exhaust and 100% would be completely opaque exhaust), or below some other predetermined level of a particular exhaust gas. If the threshold level is exceeded the computer can reduce the throttle voltage or institute some change in the fuel makeup or mixture until the emission level drops below the threshold.

Third, the computer 10 could control the throttle voltage in response to information from the GPS receiver 12. This control mode would likely involve the establishment of a throttle voltage profile. This can be accomplished by allowing a driver of particularly high skill in driving to conserve fuel to drive the vehicle over a predetermined course. The relay switch 26 would be set to the factory control position 34, enabling the computer 10 to collect throttle voltage information, and time, position, and elevation data from the GPS receiver 12 in communication with the satellites 14. Furthermore, vehicle speed could also be monitored by the computer 10 or computed based on the time and position data. This information could be collected on a periodic basis, for example, once a second or once every 100 feet, or any other convenient interval. This information can be recorded and used at a later date on a trip by another driver over the same or substantially similar route, in the same or substantially similar vehicle. On the return trip the computer 10 can use the previously created profile to control the throttle position. Again, with the GPS sensor 12 activated, the computer 10 can compare the current vehicle position and throttle voltage to the historical data, and use adaptive techniques to match the current throttle voltage to the throttle voltage at the same location based on the historical data.

In addition to the sensors mentioned hereinabove, other sensors could be used with the present invention. For example, a wind resistance sensor could be used to calculate wind speed and direction. This information would be used by the computer 10 to adjust the throttle voltage. The computer 10 would be able to calculate adjustments to throttle voltage to compensate or adjust for any differences between current wind resistance and the wind resistance at the time the historical data was collected.

In practice, the best results, i.e. those results that minimize emissions and maximize fuel economy, may be achieved by a control program that combines all responses to all three sensors to achieve the most efficient performance. In general, the control program would follow the control flow represented by the following pseudo code:

```
BEGIN CONTROL LOOP [While Brake_Pedal = On]
{
    OBSERVE Pollution
    CALCULATE c= Fuel(Pollution)
    CALCULATE b = Prediction(x)
    CALCULATE a = Throttle(x)
    CALCULATE Throttle_Power_New = a + b + c +
    Throttle_Power_Old
    Apply Throttle_Power_New
    CALCULATE Throttle_Power_Old = Throttle_Power_New
}
REPEAT LOOP
```

Pollution is the response from the emission analyzer 16. The value of x equals the vehicles real world position, speed, and/or elevation as determined by the GPS receiver 12. The Fuel function uses the parameter Pollution to calculate the throttle voltage adjustment coefficient c that becomes a component of the throttle adjustment equation. If the emission threshold is within the predetermined tolerance then the value of c equals zero. If the emission threshold is exceeded then the value of c would become negative, exerting a drag on throttle voltage. This would then begin to slow the vehicle until the emission level drops below the threshold level. Alternatively, if the emission threshold is exceeded the fuel mixture or composition could be altered by the computer 10 to reduce the emissions. In particular, the air/fuel mixture could be adjusted, or water and/or a mixture of water and alcohol could be added to the fuel mixture to reduce emissions. Water and/or a water and alcohol mixture could be either port injected or injected directly into the combustion chamber to reduce, for example, oxides of nitrogen ($NO_x$).

The Prediction function uses the parameter x to calculate the throttle voltage adjustment coefficient b. The Prediction equation could be as simple as exactly matching the historical throttle voltage to the current voltage. In practice, however, driving and vehicle conditions vary enough that this method may not produce the best results. An alternative Prediction function would match the slope of the historical run to the current run. In other words, the function would look ahead a specified number of control points (based on either time or distance) and determine the slope of the historical throttle voltage versus time/distance curve, and then apply that slope to the current data to adjust current throttle position. The coefficient b could be negative or positive depending on whether the throttle voltage needs to be decreased or increased, respectively.

The Throttle function uses the parameter x to calculate the throttle voltage adjustment coefficient a. The Throttle function comprises the direct attempt to control speed, and would use the standard cruise control equations known in the art to perform this function. These equations attempt to drive the difference in actual speed and a target speed (delta speed) to zero. In situations where either coefficient b or c become large enough that an imbalance exists between the values of b or c, and a, then an adjustment to the target speed will be needed. This will result, for example, when the historical profile shows that the vehicle is approaching a major uphill or downhill section of the road. In the case of a downhill section, the Prediction function will allow the vehicle to gain speed down the hill, while at the same time the Throttle function will attempt to slow the vehicle. If this imbalance will persist over more than a couple of control points, the target speed would be raised to correct the imbalance. In the situation where the vehicle is approaching a major uphill section requires the reverse control method.

The values of the coefficients a, b, c can be determined by the computer 10 based on a predetermined weighting scheme that seeks to achieve the best overall performance, or the driver can set or influence the values on a real time basis. For example, the driver could enter information into the computer 10 instructing the computer 10 to control the throttle voltage to maximize or minimize fuel economy, emissions, or to maintain a constant speed. The relative importance the driver gives to these factors would determine the weight given to each of the coefficients a, b, c.

Another feature of the present invention is the ability of the computer 10 to predict and report the difference in fuel economy or the amount of emission reduction achieved under throttle control. The computer 10 can track the changes, corrections, or adjustments made to the throttle voltage in relation to straight cruise control, for example, and keep a log of the improvement to fuel economy or emission reduction that results. This information would be useful in quantifying the value of the invention in terms of fuel savings, or emission reduction.

Those of ordinary skill in the art will understand that the exact control method and equations will vary depending on the vehicle, the vehicle load, the road, and driving conditions. Thus, some experimentation and profiling will be required in order to determine the exact equations and weighting factors.

Another aspect of the present invention includes a remote communication device (RCD) 17 operatively connected to the computer 10, or alternatively directly connected to the exhaust analyzer 16 (connection shown in phantom). The RCD 17 provides for transmission of information received from one or more of a plurality of sensors that monitor some indicator of engine performance and/or of engine combustion. For example, the RCD 17 could transmit information from the exhaust analyzer 16 to a remote monitoring location 21 via a communication network 19. The remote communication scheme for communicating combustion performance parameter like exhaust analyzer information could utilize a wireless modem device and communication network, a cellular network, a PCMCIA communication device, a radio transmitter and transceiver, satellite communications technology, or the like.

The information transmitted from the exhaust analyzer 16 could include important parameters of engine performance and fuel combustion like HC, CO, $CO_2$, $O_2$, and NOx gas concentrations. From these parameters a person or device at the remote monitoring location 21 could quickly identify on a realtime basis poor performing vehicles, or changes in vehicle performance that should be addressed through maintenance procedures or modification of driving behavior. For example, the remote monitoring location 21 could utilize a computer program means to identify out of range conditions for certain exhaust parameters, or a manual system could be used where a person monitors the information coming from the exhaust analyzer 16 at predetermined intervals. In either event, any particular problem vehicle could be quickly identified based on indicators of engine performance, or driver behavior that would lead to poor fuel economy, allowing for immediate remedial attention.

Figure 4:
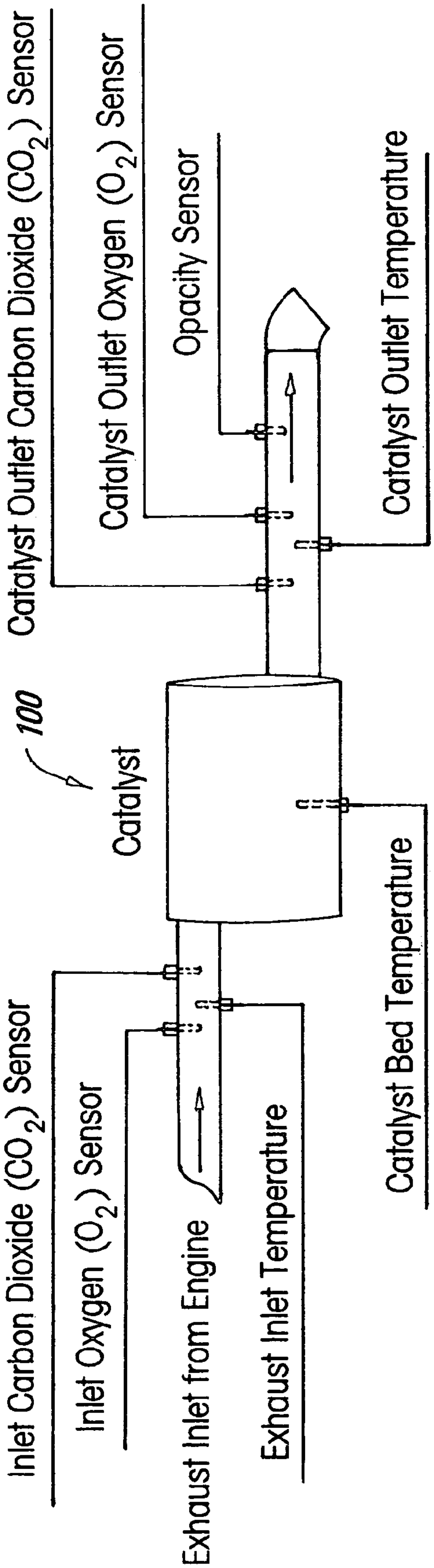
FIG. 4 is a diagram of a catalytic converter with a plurality of combustion sensors.

In addition, the RCD 17 could transmit information from a catalytic converter 100 configured with plurality of sensors (FIG. 4). The sensors associated with the catalytic converter 100 can interface with the computer 10, or directly with the RCD 17. The catalytic converter 100 comprises a secondary combustion chamber that combusts unburned fuel expelled from the engine. The amount of combustion that takes place in the catalytic converter 100 indicates the quality of the primary combustion process. However, while reducing emissions of unburned fuel and its constituent components, the catalytic converter 100 can hide inefficiencies in engine performance thereby making it difficult to identify problem conditions that need correction or that would over time lead to serious engine deterioration. Thus, it is desirable to monitor engine combustion performance in a manner that accounts for the activity of the catalytic converter 100. Communication of the output one or more of the plurality of sensors associated with the catalytic converter 100 to the RCD 17, or to the computer 10, would allow detection of any such problem in combustion performance. Monitoring the catalyst bed temperature, inlet/outlet temperature, and the inlet/outlet $CO_2$ or $O_2$ levels or some combination of the foregoing sensors would allow for determining the amount of secondary combustion taking place in the catalytic converter 100 and by proxy the performance of the primary combustion taking place in the engine of the vehicle. In particular, the monitoring could be based on the differential between inlet/outlet temperatures, based on catalyst bed temperature, or based on the differential between inlet/outlet $CO_2$ or $O_2$ levels.

Another sensor capable of adaptation for use with the present invention comprises an accelerometer 102. An electromechanical or mechanical accelerometer 102 can be attached to the engine to detect irregularities in engine combustion performance through detection of very small irregularities in acceleration. For example, an accelerometer 102 could detect irregular cylinder firing patterns, or even a dead cylinder, that might not be detectable to the operator of the vehicle. The accelerometer 102 can interface directly with the computer 10, or to the RCD 17, for communication to the remote monitoring location 21.

An opacity sensor is yet another example of a sensor capable of adaptation for use with the present invention for communication of parameters of engine combustion performance (see FIG. 4). The opacity sensor could interface with the computer 10, or directly with the RCD 17, for communication to the remote monitoring location 21. The opacity sensor essentially would measure the amount of particulate in the engine exhaust, which is a measure of combustion quality. The more particulate in the exhaust the less efficient the combustion process, and the more likely that the engine has developed, or will develop, problems that require mechanical attention. In practice, it would be advisable to use periodic sampling and retract or cover the opacity sensor when not in use to limit its exposure to engine exhaust. Prolonged exposure could coat the sensor with carbon thereby limiting its utility.

The following information is helpful in illustrating the utility of realtime monitoring of some measure combustion efficiency. Table 1 shows the partial results of opacity testing performed on the exhaust of a fleet of school buses with very new engines (three of the mileage entries are believed to be excessive and the result of data entry error). The data shows that even with relatively new engines at least three of the buses exhibited opacity readings in excess of 18%, and one bus had a reading of 27.5%. The fleet averaged an opacity reading of 7.78%. Thus, the information in Table 1 clearly identifies three candidate vehicles for inspection and/or maintenance based on poor combustion performance. Without this testing information the problems in these vehicles would likely have gone undetected due to the fact that the opacity levels were not high enough to allow for visible detection, and new vehicles would likely not be scheduled for the type of maintenance that would detect the underlying problems. Left undetected the problem would worsen possibly to the point of requiring engine replacement, and at the least the vehicle would waste fuel and needlessly increase pollutants until the problem is detected or corrected. Accordingly, the realtime availability of such data would be very useful in identifying problem vehicles and facilitating changes thereto.

TABLE 1

2002 School Bus Opacity Data

| Number of vehicles | Vehicle Number # | Location | Engine Manufacturer | Engine Model | Injection Type | Hours/ Mileage | Year | Current PM Density % before DriverMax |
|---|---|---|---|---|---|---|---|---|
| 2542 | 6 | Clear Lake | Navistar/IH | V8 | Electronic | 18,868 | 2002 | 27.50 |
| 2543 | 02-14 | Van Horne | Navistar/IH | V8 | Electronic | 17,373 | 2002 | 18.70 |
| 2544 | 6 | Elk Horn - Kimballton | Navistar/IH | V8 | Electronic | 8,472 | 2002 | 18.00 |
| 2545 | 03 | Prescott | Navistar/IH | V8 | Electronic | 8,741 | 2002 | 13.10 |
| 2546 | 33 | Iowa City | Navistar/IH | V8 | Electronic | 713 | 2002 | 13.00 |
| 2547 | 2 | Burnside | Navistar/IH | V8 | Electronic | 14,464 | 2002 | 11.70 |
| 2548 | 3 | Rock Valley Christian | Navistar/IH | V8 | Electronic | 8,342 | 2002 | 11.60 |
| 2549 | 8 | Buffalo Center | Navistar/IH | V8 | Electronic | 13,395 | 2002 | 11.20 |
| 2550 | 8 | Clear Lake | Navistar/IH | V8 | Electronic | 10,499 | 2002 | 10.40 |
| 2551 | 12 | Carroll | Navistar/IH | V8 | Electronic | 6,179 | 2002 | 10.30 |
| 2552 | 32 | Iowa City | Navistar/IH | V8 | Electronic | 723 | 2002 | 9.93 |
| 2553 | 16 | Nevada | Navistar/IH | V8 | Electronic | 8,503 | 2002 | 9.73 |
| 2554 | 4 | Lenox | Navistar/IH | V8 | Electronic | 16,378 | 2002 | 8.80 |
| 2555 | 29 | Iowa City | Navistar/IH | V8 | Electronic | 79 | 2002 | 8.75 |
| 2556 | 31 | Iowa City | Navistar/IH | V8 | Electronic | 71 | 2002 | 8.28 |
| 2557 | 9 | South Page | Navistar/IH | 6 cyl | Electronic | 3,060 | 2002 | 8.16 |
| 2558 | 01 | Farragut | Navistar/IH | V8 | Electronic | 8,884 | 2002 | 7.84 |
| 2559 | 30 | Iowa City | Navistar/IH | V8 | Electronic | 73 | 2002 | 7.33 |
| 2560 | 202 | Spencer | Navistar/IH | 6 cyl | Electronic | 7,823 | 2002 | 6.98 |
| 2561 | 4 | Iowa City | Navistar/IH | V8 | Electronic | 73 | 2002 | 6.83 |
| 2562 | 01-6 | Sioux Central | Navistar/IH | V8 | Electronic | 15,262 | 2002 | 6.76 |
| 2563 | 22 | New Hampton | Navistar/IH | V8 | Electronic | 217 | 2002 | 6.62 |
| 2564 | 9 | South O'Brien | Navistar/IH | V8 | Electronic | 12,898 | 2002 | 6.50 |
| 2565 | 14 | Fremont- Mills | Navistar/IH | V8 | Electronic | 7,552 | 2002 | 6.28 |
| 2566 | 01 | Hull-Western Christian High | Navistar/IH | V8 | Electronic | 17,845 | 2002 | 6.22 |
| 2567 | 7 | Clear Lake | Navistar/IH | V8 | Electronic | 14,378 | 2002 | 6.04 |
| 2568 | 3 | Perry | Navistar/IH | 6 cyl | Electronic | 1,892 | 2002 | 6.01 |
| 2569 | 28 | Ankeny | Navistar/IH | V8 | Electronic | 8,057 | 2002 | 5.63 |
| 2570 | 9 | Grundy Center | Navistar/IH | V8 | Electronic | 15,080 | 2002 | 5.57 |
| 2571 | 2 | Clarksville | Navistar/IH | V8 | Electronic | 447 | 2002 | 4.83 |
| 2572 | 22 | Allamakee- Waukon | Navistar/IH | 6 cyl | Electronic | 353 | 2002 | 4.39 |
| 2573 | 2 | Wyoming | Navistar/IH | V8 | Electronic | 9,293 | 2002 | 4.00 |
| 2574 | 2 | Odebolt | Navistar/IH | V8 | Electronic | 2,997 | 2002 | 3.91 |
| 2575 | 10 | Valley, Elgin | Navistar/IH | IHT444E | Electronic | 3,168 | 2002 | 3.25 |
| 2576 | 21 | Spirit Lake | Navistar/IH | 6 cyl | Electronic | 3,728 | 2002 | 2.99 |
| 2577 | 05 | Decorah | Navistar/IH | 6 cyl | Electronic | 9,310 | 2002 | 2.98 |
| 2578 | 2 | Alta | Navistar/IH | V8 | Electronic | 5,319 | 2002 | 2.64 |
| 2579 | 55 | Lynnville Sully | Navistar/IH | 6 cyl | Electronic | 1,535 | 2002 | 2.60 |
| 2580 | 11 | Wellman-Mid Prairie | Navistar/IH | 6 cyl | Electronic | 1,656 | 2002 | 1.96 |
| 2581 | 27 | Decorah | Navistar/IH | 6 cyl | Electronic | 11,821 | 2002 | 1.23 |
| 2582 | 12 | Wellman-Mid Prairie | Navistar/IH | 6 cyl | Electronic | 2,507 | 2002 | 0.34 |
| | | | | | | | Average | 7.78 |

As Table 1 indicates the problem of poor combustion is not isolated to older vehicles, even new engines can have substantial engine performance or fuel combustion problems. For example, vehicle number 6 with 8472 miles had an opacity level of 18%, while vehicle number 05 with 9,310 miles had an opacity level of 2.98%. Clearly, there is a problem with the vehicle number 6 that likely existed from the day the bus arrived from the factory. Without this information it is unlikely that a brand new bus would have been tested, or thought to have such a problem, and the problem would have persisted causing further engine damage, continued to waste fuel, thereby needlessly increasing the cost of operation as well as pollution levels. However, as expected older vehicles show even worse deterioration.

illustrates the benefit from realtime monitoring and profiling of vehicle performance and of the performance of a fleet of vehicles, without which the problems would have persisted.

Such analysis done realtime eliminates the need to take the vehicle out of service for special testing, and allows for more closely monitoring the performance to better detect changes in performance. In addition, it is anticipated that the realtime monitoring could not only detect engine performance and combustion problems, but also detect difference in driving habits of drivers of fleet vehicles. If the data suggests that engine performance or combustion performance for some drivers is better than others, remedial action can be taken to transfer the techniques of the more skilled drivers to the less skilled drivers also resulting in better vehicle performance, reduced need or maintenance, and in reduced fuel costs.

TABLE 2

1987 School Bus Opacity Data

| Number | Fleet Analysis | | | | | | | Opacity | |
|---|---|---|---|---|---|---|---|---|---|
| | | | | | | | | Current PM Density % | Soot |
| of vehicles | Vehicle Number # | Location | Engine Manufacturer | Engine Model | Injection Type | Hours/ Mileage | Year | before DriverMax | # Soot Before |
| 4399 | 8701 | Cedar Rapids | Navistar/IH | | Mechanical | 161,710 | 1987 | 75.10 | 432.13 |
| 4400 | 1 | Pella | Navistar/IH | 6 cyl | Mechanical | 19,271 | 1987 | 59.80 | 344.09 |
| 4401 | 30 | Huffman Trans. Mason City | Navistar/IH | V8 | Mechanical | 140,835 | 1987 | 59.00 | 339.49 |
| 4402 | 15 | Iowa Falls | Navistar/IH | 6 cyl | Mechanical | 159,149 | 1987 | 59.90 | 338.92 |
| 4403 | 8705 | Cedar Rapids | Navistar/IH | | Mechanical | 155,875 | 1987 | 58.10 | 334.31 |
| 4404 | 11 | AR-WE-VA | Navistar/IH | 6 cyl | Mechanical | 141,589 | 1987 | 56.70 | 326.26 |
| 4405 | 10 | Keokuk | Navistar/IH | 6 cyl | Mechanical | 124,745 | 1987 | 55.00 | 316.48 |
| 4406 | 5 | East Greene | Navistar/IH | 6 cyl | Mechanical | 165,830 | 1987 | 52.00 | 299.21 |
| 4407 | 15 | Mt. Pleasant | Navistar/IH | IHT444E | Mechanical | 161,568 | 1987 | 48.00 | 276.20 |
| 4408 | 7 | Mediapolis | Navistar/IH | V8 | Mechanical | 223,621 | 1987 | 43.40 | 249.73 |
| 4409 | 28 | Huffman Trans. Mason City | Navistar/IH | V8 | Mechanical | 123,096 | 1987 | 42.90 | 246.85 |
| 4410 | 87 | Moville | Navistar/IH | 6 cyl | Mechanical | 147,653 | 1987 | 42.70 | 245.70 |
| 4411 | 24 | Eddyville | Navistar/IH | 6 cyl | Mechanical | 222,782 | 1987 | 41.90 | 241.10 |
| 4412 | 707 | Western Dubuque | Navistar/IH | V8 | Mechanical | 147,175 | 1987 | 41.30 | 237.64 |
| 4413 | 7 | Hull-Western Christian High | Navistar/IH | 6 cyl | Mechanical | 217,288 | 1987 | 41.00 | 235.92 |
| 4414 | 704 | Western Dubuque | Navistar/IH | V8 | Mechanical | 217,153 | 1987 | 39.90 | 229.59 |
| 4415 | 702 | Western Dubuque | Navistar/IH | V8 | Mechanical | 142,567 | 1987 | 39.60 | 227.86 |
| 4416 | 14 | Sioux City | Navistar/IH | 6 cyl | Mechanical | 180,417 | 1987 | 38.70 | 222.68 |
| 4417 | 39 | Fort Madison | Navistar/IH | 6 cyl | Mechanical | 51,266 | 1987 | 38.10 | 219.23 |
| 4418 | 8707 | Cedar Rapids | Navistar/IH | | Mechanical | 173,121 | 1987 | 38.00 | 218.66 |
| 4419 | 9 | Miles | Navistar/IH | 6 cyl | Mechanical | 157,083 | 1987 | 36.90 | 212.33 |
| 4420 | 10 | Miles | Navistar/IH | V8 | Mechanical | 147,628 | 1987 | 36.80 | 211.75 |
| 4421 | 2 | Pella Christian | Navistar/IH | V8 | Mechanical | 154,075 | 1987 | 35.00 | 201.39 |
| 4422 | 8702 | Cedar Rapids | Navistar/IH | | Mechanical | 186,182 | 1987 | 35.00 | 201.39 |
| 4423 | 18 | Wapello | Navistar/IH | | Mechanical | 132,431 | 1987 | 34.30 | 197.37 |
| 4424 | 8704 | Cedar Rapids | Navistar/IH | | Mechanical | 178,810 | 1987 | 34.00 | 195.64 |
| 4425 | 8703 | Cedar Rapids | Navistar/IH | | Mechanical | 166,606 | 1987 | 33.80 | 194.49 |
| 4426 | 9 | Burnside | Navistar/IH | 6 cyl | Mechanical | 145,135 | 1987 | 33.70 | 193.91 |
| 4427 | 703 | Western Dubuque | Navistar/IH | V8 | Mechanical | 158,238 | 1987 | 32.90 | 189.31 |
| 4428 | 8 | Nora Springs | Navistar/IH | 6 cyl | Mechanical | 170,526 | 1987 | 32.50 | 187.01 |
| 4429 | 8714 | Cedar Rapids | Navistar/IH | | Mechanical | 179,176 | 1987 | 30.80 | 177.23 |
| 4430 | 5 | Nashua | Navistar/IH | V8 | Mechanical | 151,377 | 1987 | 30.70 | 176.65 |
| 4431 | 87 | Boyden- Hull | Navistar/IH | V8 | Mechanical | 67,782 | 1987 | 30.00 | 172.62 |
| 4432 | 15 | Sioux City | Navistar/IH | 6 cyl | Mechanical | 179,968 | 1987 | 29.60 | 170.32 |
| 4433 | 7 | Monticello | Navistar/IH | V8 | Mechanical | 180,542 | 1987 | 28.70 | 165.14 |
| 4434 | 14 | Fort Madison | Navistar/IH | DT360 | Mechanical | 198,896 | 1987 | 28.70 | 165.14 |

Figure 5:
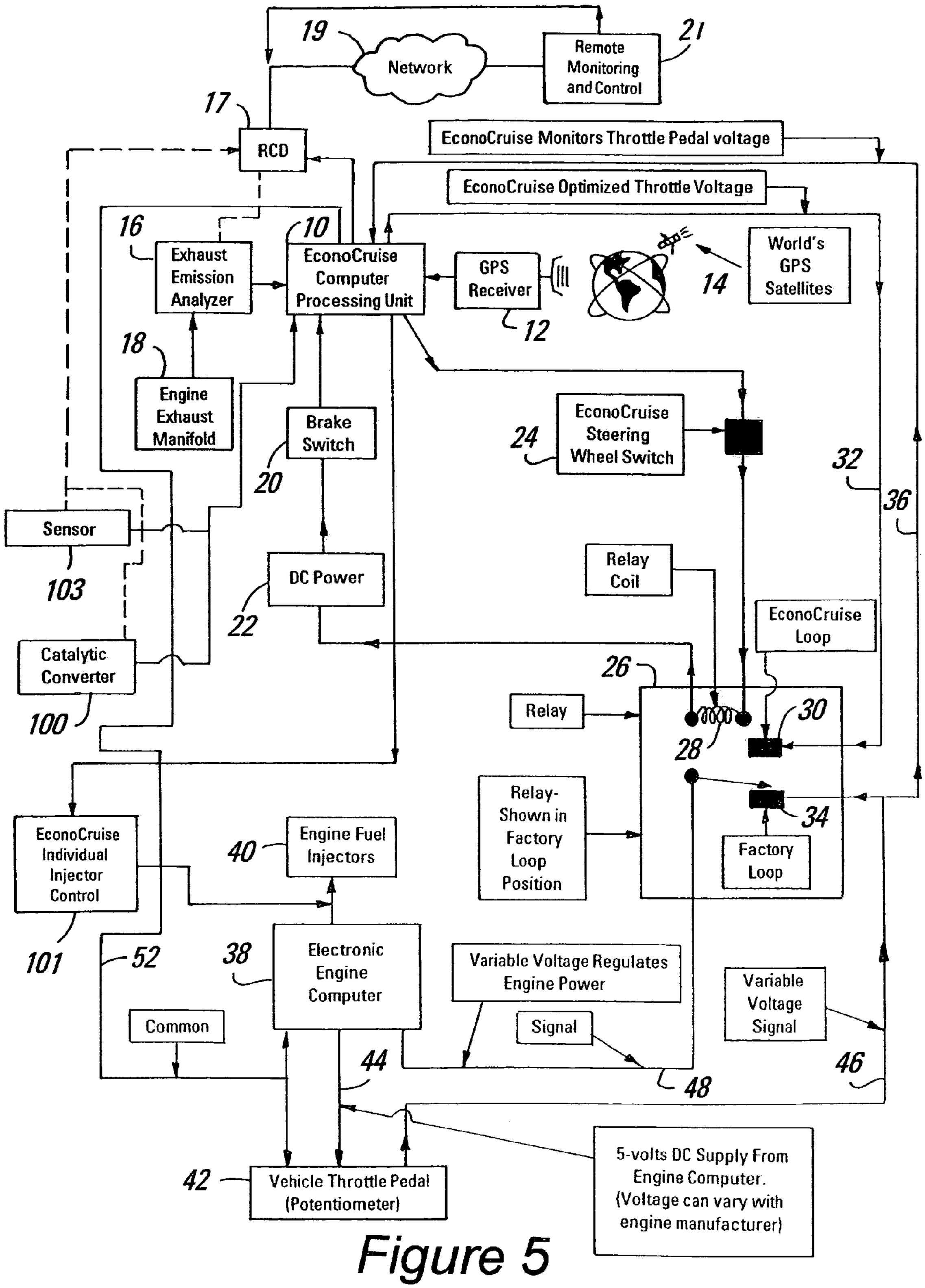
FIG. 5 is a schematic drawing of an alternative embodiment of the invention.

Table 2 shows partial data taken from a fleet of older school buses with 1987 engines. The data shows that seven of the buses have opacity readings of 55% or more, indicating major engine or combustion problems. Also, a large number of the buses have opacity readings in excess of 28% also indicating some level of deterioration and poor performance. All of these buses would be candidates for some level of maintenance, ranging from a tune up to engine replacement. Again, this A further aspect of the invention results from monitoring engine performance in a more particular manner, as is shown in FIG. 5. For example, sensors attached to the engine could monitor the performance of each cylinder of the engine. A sensor 103 can be attached to each engine cylinder, or a proxy thereof, and the information gained about performance communicated through the remote communication device 17 to the remote monitoring and control center 21. A decision can then be made on how to deal with the engine problem, and communicated back to the remote communication device 17. Any actual adjustment is made through the computer 10, in a manner similar to that disclosed hereinabove.

For example, the sensor 103 could comprise a temperature sensor located on the exhaust port of each cylinder of the engine. Temperature differential are reported to the computer 10, or to the remote communication device 17 and then to the remote monitoring and control location 21. Personal or computers at the location 21 can make a decision about how to adjust the performance of the cylinder of the engine to minimize the problem, and can alert personal at the site of the engine to make repairs as needed.

Adjustment to the cylinders of the engine is made through individual injector controller 101. The controller 101 interfaces with the computer 10 and the engine fuel injectors 40. To reduce over fueling, or to generally control/optimize the performance of the detected cylinder, the max pulse of the particular injector can be adjusted. For example, if the cylinder is not burning all of the available fuel, and adjustment would reduce the amount of fuel delivered to the cylinder to provide only the amount of fuel combusted by that cylinder. A signal from the remote monitoring and control site 21 can be sent to the remote control device 17, then to the computer 10, and then to the injector controller 101 for this purpose.

Other methods for detecting a malfunctioning or under performing cylinder through the sensor 103 include using an accelerometer. The accelerometer can measure the recoil of combustion, which when combined with engine firing patterns can reveal a weak explosion from an impaired cylinder. The accelerometer can be located on the engine, the crankshaft, or any other similarly located engine component. A person of ordinary skill would be able to create an algorithm to correlate readings from the accelerometer with individual cylinder firing.

The sensor could comprise an emission sampling tube, or an opacity sensor located on or near the exhaust port of each cylinder. The sensor could sample periodically, preferably during the power output cycle of the engine to detect differences in emissions that would indicated over fueling or a high level of unspent fuel indicative of poor cylinder combustion.

In each case, the feed back loop from the sensor 103 to the injector controller 101 would be the same as that described hereinabove in reference to the temperature sensor.

This aspect of the invention is particularly useful for engines operating in a remote environment, like engines on ships at sea or other isolated or distance locations. The remote monitoring and control location 21 can be located anywhere, and could provide a convenient means of overseeing performance. The invention is also useful in monitoring a large fleet of engines. For example, a trucking company or other similar enterprise that has a large fleet of vehicles, and track status and condition of the engines in its fleet of vehicles. This would allow for central control and notification of problems.

Of course, those of ordinary skill will understand that the various computer control devices can be combined into one device, and that the remote monitoring location does not have to be located a great distance from the engine being monitored, and can be at the same site to allow for real time notification and adjustment of any detected problems.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing from the scope of the invention.

The invention claimed is:

1. An apparatus for remote identification of combustion performance of a vehicle, said apparatus comprising:

a vehicle with a throttle device for control of fuel into a multiple cylinder engine of said vehicle;

a sensor in operative communication with said vehicle for the purpose of analyzing a vehicle combustion parameter, wherein said sensor can sense combustion on at least one cylinder of said engine;

a remote communication device in operative communication with said combustion sensor for communicating said combustion parameter;

a remote monitoring network for receiving said combustion parameter from said remote communication device over a network to enable remote monitoring of vehicle performance.

2. The invention in accordance with claim 1 further comprising a computer control device for controlling the amount of fuel to said cylinder of said engine in response to said sensor that indicates performance of said cylinder of said engine.

3. The invention in accordance with claim 2 wherein said computer is in operative communication with said sensor, and said remote communication device is in operative communication with said sensor through said computer.

4. The invention in accordance with claim 1 wherein said remote communication utilizes cellular communications.

5. The invention in accordance with claim 1 wherein said remote communication utilizes satellite communication.

6. The invention in accordance with claim 1 wherein said remote communication utilizes a radio transmitter and receiver.

7. The invention in accordance with claim 1 wherein said remote communication utilizes a wireless modem.

8. The invention in accordance with claim 1 further providing a global positioning satellite receiver located on said vehicle for receiving satellite signals that allow for locating a position of said vehicle, and said remote communication includes said vehicle position.

9. The invention in accordance with claim 1 wherein said sensor comprises an exhaust analyzer.

10. The invention in accordance with claim 1 wherein said sensor comprises a temperature sensor.

11. The invention in accordance with claim 1 wherein said sensor comprises an accelerometer.

12. The invention in accordance with claim 1 wherein said sensor comprises an opacity sensor.

13. The invention in accordance with claim 1 further comprising an injector controller for controlling the amount of fuel in a fuel injector of said engine.

14. The invention in accordance with claim 13 wherein said injector controller is adjusted in response to said combustion parameter.

15. The invention in accordance with claim 1 further comprising a sensor in operative communication with each of said cylinders of said engine.

* * * * *